United States Patent [19]

Ueda

[11] 4,024,713
[45] May 24, 1977

[54] BRAKE BOOSTER

[75] Inventor: Atsumi Ueda, Toyota, Japan

[73] Assignee: Aisin Seiki Kabushiki Kaisha, Kariya, Japan

[22] Filed: June 22, 1976

[21] Appl. No.: 698,733

[30] Foreign Application Priority Data

June 30, 1975 Japan .............................. 50-80637

[52] U.S. Cl. .............................. 60/547; 91/369 R; 91/391 R
[51] Int. Cl.² .......................................... F15B 7/08
[58] Field of Search ............ 60/547, 548, 550, 403; 91/369, 370, 391

[56] References Cited
UNITED STATES PATENTS

| | | | |
|---|---|---|---|
| 3,033,173 | 5/1962 | Bauman | 60/547 X |
| 3,935,709 | 2/1976 | Mathues | 91/369 B X |

Primary Examiner—Edgar W. Geoghegan
Attorney, Agent, or Firm—Oblon, Fisher, Spivak, McClelland & Maier

[57] ABSTRACT

A dual source power brake booster assembly includes an air-vacuum operated booster section and a hydraulic pressure operated booster section disposed in series. The assembly is so arranged that the vacuum booster section is initially actuated to obtain a booster brake operation when the vehicle operator depresses a brake pedal, and the hydraulic booster section is actuated so as to continue the booster brake operation in response to an increased depression upon the brake pedal after the vacuum booster section reaches its limit or run-out condition. The hydraulic booster section has a power piston to thereby define two fluid chambers, the power piston having pressure receiving areas, respectively subjected to the hydraulic pressures within both chambers, which are the same so that so long as the hydraulic booster section is in its non-operating or brake released condition, a hydraulic force, which normally biases or actuates the power piston, will not be generated. Both of the booster sections may also have reaction means, respectively, whereby the operator can sense a predetermined amount of the brake booster force.

7 Claims, 1 Drawing Figure

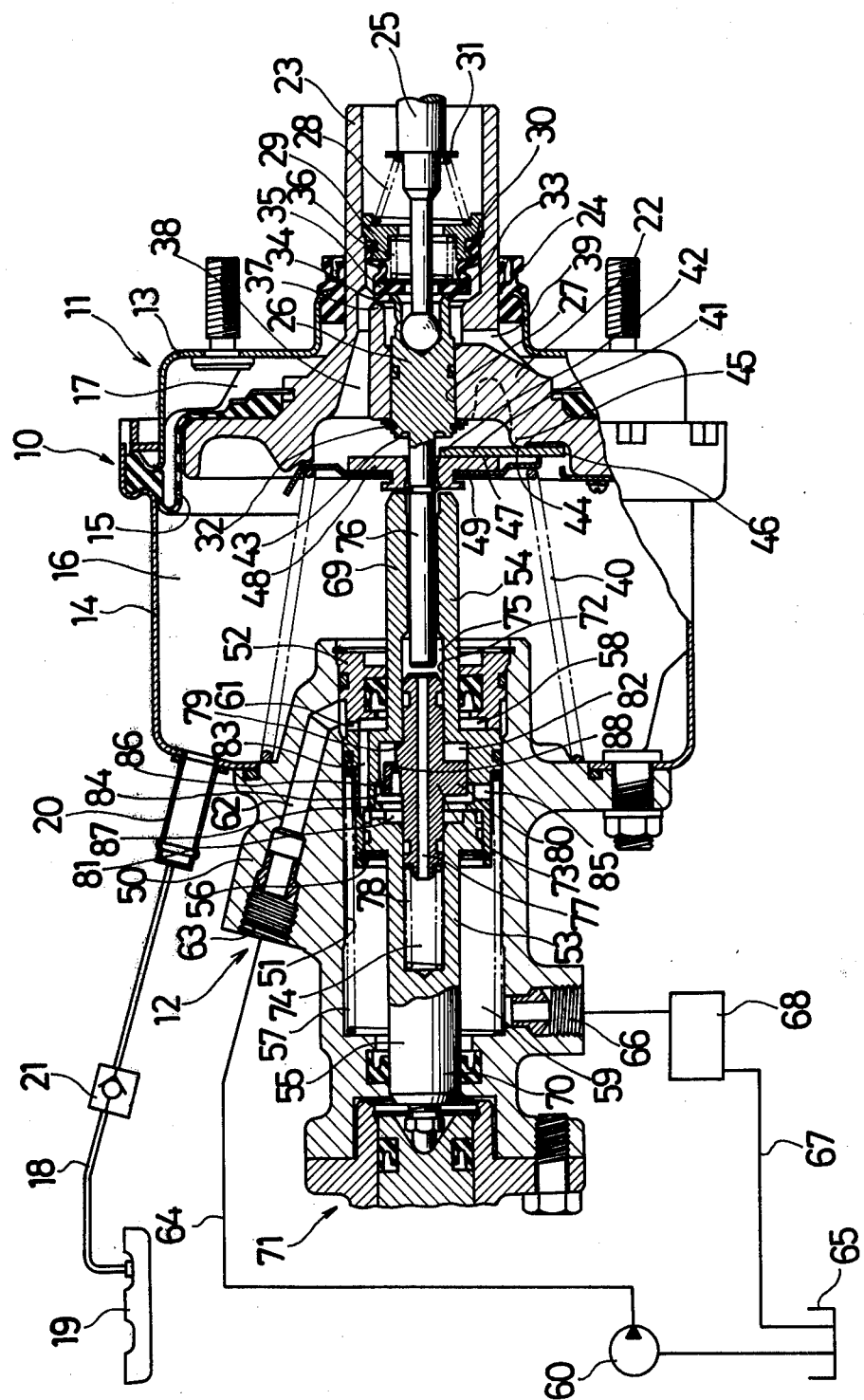

BRAKE BOOSTER

BACKGROUND OF THE INVENTION

1. Field of the Invention:

The present invention relates generally to a dual source, power brake booster assembly and more particularly to an assembly having, in series, an air-vaccuum operated booster section and a hydraulic pressure operated booster section.

2. Description of the Prior Art:

Conventionally, the booster assembly of the above mentioned type has been proposed wherein the booster brake pressures are initially obtained by operation of the vacuum booster section without operating the hydraulic booster section, and are then obtained by operation of the hydraulic booster section after the vacuum booster section reaches its limit or run-out condition. The above assembly is effective to reduce the consumption of vacuum, and a example of such an assesmbly is illustrated in U.S. Pat. No. 3,935,706.

The hydraulic booster section of such prior art device has, however, differential hydraulic pressure receiving areas which generate a force for biasing a hydraulically actuated power piston, and a valve member operatively associated with an input member so as to actuate the hydraulically actuated power piston, when a hydraulic pressure is generated within the hydraulic booster section. By this construction, another fluidically actuated means, such as, for example, a power steering gear, must be interposed between a hydraulic pressurized source and the hydraulic booster section so as not to generate any hydraulic force within the hydraulic booster section even when the power steering gear is brought into its operative condition, However, this requires a power steering gear which can deliver at least the fluid pressure required by the hydraulic booster even when the power steering gear is in its operative condition.

SUMMARY OF THE NVENTION

It is, therfore, an object of the present invention to provide an improved dual source power brake booster assembly which obviates the drawback mentioned above.

It is another object of the present invention to provide an improved dual source power brake booster assembly in which a hydraulic force will not be generated within the hydraulic booster section so long as the hydraulic booster section is in its brake released condition.

BRIEF DESCRIPTION OF THE DRAWING

Various other objects, features and attendant advantages of the present will be more fully appreciated as the same becomes better understood from the following detailed description when considered in connection with the accompanying drawing wherein:

THE SOLE FIGURE is a cross-sectional view of the brake booster assembly, with the fluid system schematically shown, embodying the present invention.

DETAILED DESCRIPTION OF A PREFERRED EMBODIMENT

Referring now to the drawing, a dual source power brake booster assembly, generally indicated by the reference character 10, includes a differential air-vacuum pressure operated booster section 11 and a hydraulic pressure operated booster section 12. The vacuum booster section 11 has first and second bodies 13 and 14 which secure the outer periphery of a diaphragm 15 therebetween, so that a constant vacuum pressure chamber 16 and a variable pressure chamber 17 are defined within bodies 14 and 13, respectively. The chamber 16 receives vacuum through a conduit 18 which is interposed between an intake manifold 19 of a vehicle engine and an inlet port 20 of the assembly, and the conduit 18 contains a check valve 21 therein. The chamber 17 is adapted to selectively receive vacuum and atmospheric air, as will be explained hereinafter.

A first or vacuum power member or piston 22, to which the diaphragm 15 is secured, has an extension 23 which extends outwardly through the body 13 and is slidable therewithin in conjunction with a sealing member 24. A push rod 25, which is axially moved by means of a brake pedal, not shown, has a ball end received in a pocket of a valve piston or input member 26 so as to provide a pivotal connection therebetween, and the valve piston 26 is slidably mounted within a bore 27 of the power piston 22. A spring 28 has one end seated against a retainer 29, which is held by means of a stepped portion 30 of the inner wall of the extension 23, and the other end seated against another retainer 31 which abuts a stepped portion of the push rod 24. Therefore, the push rod 25 is biased by means of the biasing force of the spring 28 to its illustrated or brake released position, and the valve piston 26 is also biased to its released position due to the pivotal connection with the push rod 25.

A stopper 32 is provided in the valve piston 26 so as to thereby limit the rightward movements of the valve piston 26 and the push rod 25, and the valve piston 26 also has an annular valve end or seat 33 which cooperates with a valve surface 34 of a resilient valve member 35 of a bellows type structure. The valve member 35 is urged toward the left by means of a spring 36 inserted between the valve member 35 and the retainer 29 so that in the normal or brake released condition, the valve surface 34 is brought into contact with the valve seat 33. Under these conditions, the valving portions at 33 and 34 interrupt the introduction of atmoshperic air into the variable chamber 17 from the space between the inner wall of the valve member 35 and the push rod 25.

The valve surface 34 of the valve member 35 is also adapted for engagement with a valve end 37 of piston extension 23 when the valve piston 26 is moved toward the left, the valve end 37 being normally spaced from the surface 34 whereby the variable chamber 17 normally receives vacuum from the vacuum chamber 16 through means of passages 38 and 39 provided in the power piston 22, respectively. This results in the fact that the same pressures are present within both chambers 16 and 17 so that the power piston 22 and the diaphragm 15 are urged by means of a return spring 40 to their illustrated original positions wherein the diaphragm 15 is brought into contact with the body 13. The leftward movements of the push rod 25 and the valve piston 26 cause the valve surface 34 to engage the valve end 37 thereby interrupting the fluid communication between both chambers 16 and 17, and by means of further movements of rod 25 and piston 26, the valve end 33 disengages from the valve surface 34 thereby introducing atmospheric air into the chamber 17.

Disposed at the left side of the power piston 22 is a plurality of radially extending reaction levers 41 only one of which is shown in the drawing. Each lever 41 has a radially inner, right end face 42 which is noramlly spaced from a shoulder 43 provided piston 26, but is mechanically engaged with the shoulder 43 in a force transmitting relationship upon performance of the brake booster operation. A substantially intermediate right face portion 44 of the lever 41 always engages an edge portion 45 of the power piston 22, and a radially outer, right end face of the lever 41 engages the power piston 22 when the vacuum booster section is in its orignnal position. The lever 41 also has a left face portion 47 which always engages a disc-shaped output member 48, the portion 47 being radially interposed between the end 42 and portion 44. A plate 49, which is mounted on the output member 48, receives one end of the spring 40, so that the plate 49, the output member 48, the levers 41, and the power piston 22 are maintained in their original positions, and the other end of the spring 40 is seated against a housing 50 of the hydraulic booster section 12.

The housing 50, of the hydraulic booster section 12, is sealingly secured to the body 14 of the vacuum booster section 11 and has a cylindrical bore 51, one open end of which is closed by means of a plug 52. Slidably disposed within the bore 51 is a second or hydraulic power member or piston 53 which has first and second sections 54 and 55. Both sections 54 and 55 are secured to each other by means of a snap ring 56, and are thus integrally movable as a unit and, it is further obvious, that both sections 54 and 55 may be formed as one body. A spring 57 has one end seated against the power piston section 54 and the other end seated against the housing 50 whereby the power piston 53 is normally maintained in its illustrated original position in which the power piston 53 is brought into contact with the plug 52.

A high pressure or working chamber 58, and a low pressure chamber 59, are defined within the bore 51 by means of the arrangement of the hydraulic power piston 53, and the working chamber 58 is adapted for receiving the fluid pressure from a pump 60 through means of a passage 61 provided within the plug 52, a passage 62 and an inlet port 63 provided in the housing 50, respectively, and a conduit 64, while the low pressure chamber 59 is normally connected to a reservoir 65 through means of an outlet port 66 and a conduit 67, a power steering gear 68 being disposed within conduit 67.

The sections 54 and 55 of the hydraulic piston have axially, outwardly extending stems 69 and 70, respectively, having the same diametrical extent, the stem 69 extending through the plug 52 and into the vacuum chamber 16 of the vacuum booster section 11, while the stem 70 extends through the housing 50 and into a conventional master cylinder 71. The hydraulic power piston 53 has a stepped bore 72 which slidably receives a spool valve 73 so as to define chambers 74 and 75 therewithin, and the stepped bore 72, at the right end thereof, also receives a stem 66 of the valve piston 26. Both chambers 74 and 75 communicate with each other through means of an axial passage 77 provided within the spool valve 73 so that the same vacuum pressures will prevail within chambers 74 and 75 because chamber 75 is always in communication with the vacuum chamber 16 through means of the space defined between the stem 69 of the hydraulic power piston 53 and the stem 76 of the valve piston 26.

Both ends of the spool valve 73 have the same effective areas which are subjected to vacuum pressure within chamber 74 and 75, respectively, and the spool valve 73 is therefore urged by means of the biasing force of a spring 78 to its original position wherein a shoulder 79 of the spool valve 73 engages a stepped portion of the power piston 53, and the right end of the spool valve 73 is spaced from the stem 76 of the valve piston 26. The spool valve 73 includes a radially enlarged portion 80 so that a hydraulic reaction chamber 81 and a hydraulic chamber 82 are defined within the hydraulic power piston 53 upon opposite side of portion 80.

The reaction chamber 81 is in communication with the working chamber 58 through means of a passage 83, and is normally connected to the hydraulic chamber 82 by means of a groove 84 provided on the power piston 53. The reaction chamber 81 is likewise normally connected to the low pressure chamber 59 by means of a passage 85 which is adapted for connection with the chamber 82. The fluid communication between the chamber 81 and the passage 85 will thus be controlled in response to a relative movement of an edge 86 of the spool valve 73 with respect to a land 87 of the power piston 53 when the spool valve 73 is moved by means of the stem 76 of the valve piston 26. An orifice 88 is provided in the spool valve 73 so as to assure fluid communication between chambers 81 and 59, through means of chamber 82, even when the relative movement between the edge 86 of the spool valve 73 and the land 87 of the power piston 53 interrupts the fliud communication between the reaction chamber 81 and the passage 85, whereby the fluid pressure for the operation of the power steering will nevertheless be assured.

In operation, the parts of the booster assembly illustrated in the drawing are in their normal or brake released conditions wherein the vacuum is introduced or maintained in the variable chamber 17 and no differential fluid pressure is generated within the chambers 58 and 59. Therefore, no booster operation is obtained.

When the operator depresses the brake pedal the leftward movement of the push rod 25 against the biasing force of the spring 28 causes the valve piston 26 to move in the same direction. The valve member 35 follows the movement of the valve piston 26 by means of the biasing force of the spring 36 while maintaining the closed condition between the valve seat 33 and the valve surface 34. The valve surface 34 will subsequently engage the valve end 37 of the power piston 22 as a result of the predetermined movement of the valve member 35, whereby the fluid communication between chambers 16 and 17 is interrupted. When the valve piston 26 is moved further, the valve seat 33 disengages from the valve surface 34 since the valve surface 34 is retained in contact with the valve end 37, and therefore, atmospheric air is introduced into the variable chamber 17 through means of the space defined between the inner wall of the valve member 35 and the push rod 25, and the passage 39. This generates the differential fluid pressures between the chambers 16 and 17 which displaces the vacuum power piston 22 toward the left against the biasing force of the spring 40, Portions 44 of the levers 41 are therefore urged toward the left, and since the portions 47 of the levers 41 engage the output members 48 which now acts as a fulcrum, levers 41 are urged into an inclined state such that the radially inner ends 42 of the levers 41 are brought into engagement with the shoulder 43 of the valve piston 26, lever actions thereby being created. In response to the increasing depression force on the brake pedal, a predetermined amount of reaction force thus being generated is transmitted to the valve piston 26 so that the operator can sense the amount of brake booster force. This reaction force will be dependent upon the ratio of each lever 41 and will be in proportion to the braking forces being generated. A major portion of reaction force is also transmitted to the power piston 22, and the output member 48 is thus moved toward the left as a result of the engagement between the levers 41 and the output member 48 so that the hydraulic power piston 53 is also moved toward the left, thereby generating the master cylinder pressure in the conventional manner.

During the aforenoted initial stage of the booster operation prior to the atmospheric pressure within chamber 17 reaching its maximum value, the power piston 22 is moved in accordance with the depression force impressed on the brake pedal so as to follow the movement of the valve piston 26 which is upstream of the power piston 22, and this means that the stem 76 of the valve piston 26 is still spaced from the spool valve 73. Therefore, the fluid pressure transmitted to the working chamber 58 is, in turn, transmitted to the low pressure chamber 59 through means of the passage 83, the reaction chamber 81, and the passage 85, and is then drained to the reservoir 65 so long as the power steering gear 68 is in its non-operation condition. No differential hydraulic pressure between chamber 58 and 59 will be obtained. If the power steering gear 68 is brought into operation at this time, the hydraulic pressures will be increased within chambers 58 and 59, but a differential hydraulic pressure will not be generated therebetween due to the arrangement of stems 69 and 70 of the power piston 53 having the same effective diameters. This means that any hydraulic force which biases the power piston 53 will not be generated within the hydraulic booster section.

When the vacuum booster operation reaches its limit or run-out condition wherein the atmospheric pressure within the variable chamber 17 of vacuum booster section 11 reaches its maximum value, and greater rake actuating pressures are required, the first power piston 22 cannot bear the additional reaction force which is generated in response to the continuously increasing depression force on the brake pedal. This causes a leftward movement of the valve piston 26 relative to the vacuum power piston 22, and ulltimately of the hydraulic power piston 53. More particularly, the stem 76 of the valve piston 26 engages the spool valve 73 so as to thereby move the latter toward the left. As a result, the edge 86 of the spool valve 73 approaches the land 87 of the power piston 53 thereby controlling or throttling the flow of fluid therebetween. The hydraulic pressure within the working chamber 58 is thus increased so that a differential hydraulic pressure within chambers 58 and 59 will be generated, and the hydraulic power piston 53 is thus moved toward the left by means of the aforenoted differential pressure so as to obtain the hydraulic booster operation, the movement of the hydraulic power piston 53 of course actuating the master cylinder 71 so as to obtained the master cylinder output pressure.

The reaction chamber 81 is hydraulically connected to the working chamber 58 so that the fluid pressure which prevails within the working chamber 58 will likewise prevail within the reaction chamber 81. This pressure within the reaction chamber 81 biases the valve spool 73 toward the right and thus the operator can sense the amount of the braking reaction force through means of the valve piston 26 and the push rod 26. During the above hydraulic booster operation, it is to be noted that the chamber 82 is fluidically connected to the low pressure chamber 59 through means of the passage 85

The increase in the hydraulic pressure within the reaction chamber 81 will be in proportion to the continuously increasing depression force impressed upon the brake pedal, and the differential hydraulic pressure between chamber 58 and 59 will be correspondingly increased. After the valve portion constituting the edge 86 of the valve spool 73 and the land 87 of the hydraulic power piston 53, is completely closed, and the differential hydraulic pressure reaches its maximum value, the hydraulic fluid within the working chamber 58 can flow into the low pressure chamber 49 only through the orifice 88 through means of passage 83, chamber 81, orifice 88, chamber 82, groove 84, and passage 85. The increase in fluid pressure within chamber 58 is thereafter prevented, and the fluid pressure within chamber 58 is maintained at its maximum value as determined by means of the orifice 88 even when the depression force on the brake pedal is continuously increased. This prevents an extra load from being imposed upon the pump 60, and assures the supply of necessary operating fluid for the power steering gear 68.

If the operator increases the depression force upon the brake pedal after the hydraulic booster section 2 reaches its run-out condition, an additional manual actuation of the master cylinder is caused by means of the mechanical connection between the valve piston 26 and the hydraulic power piston 53 through means of levers 41 and the output member 48 so that the master cylinder pressure will be further increased.

When the operator releases the brake pedal, the valve piston 26 is returned by means of the spring 28 and the spool valve 73 follows by means of the biasing force of spring 78. The valving portion at 86 and 87 is controlled so as to be open, whereby the reaction and working chambers 81 and 58 are fluidically connected to the low pressure chamber 59 without a throttling effect therebetween. The differential hydraulic pressure between chambers 58 and 59 is reduced, and the hydraulic power piston 53 is returned to its original position by means of the spring 57. As a result if the return movement of the valve piston 26, valve seat 33 engages the valve surface 34, the valve surface 34 then being spaced from the valve end 37 of the vacuum power piston 22. The variable chamber 17 now receives vacuum so that the vacuum power piston 22 is biased to and maintained at its original or illustrated position.

Assuming that there is no power pressure available to the vacuum booster section 11, the depression force on the brake pedal immediately causes the engagement between the valve piston 26 and the spool valve 73 whereby a substantial immediate operation of the hydraulic booster section 12 will be caused. If there is no power pressure available to the hydraulic booster section 12, due to the failure of pump 60, or the like, it is apparent that the vacuum booster operation will be nevertheless be assured in substantially the same manner as noted hereinabove. When there is no power pressure available for either booster section, additional depression force impressed upon the brake pedal is exerted manually, through both booster sections, to the master cylinder so as to obtain the manual actuation thereof.

From the above teachings, a modification of the present invention will be obvious wherein the vacuum booster section will be commenced to be actuated so as to continuously obtain the booster brake operation in response to the continuously increased depression of the brake pedal after the hydraulic booster section reaches its run-out condition. In accordance with such a modification, the stem 76 of the valve piston 26 may always be in engagement with the spool valve 73, and the valve end 37 of the vacuum power piston 22 may be disposed at a greater distance from the valve surface 34 of the valve member 35 so that the valve end 37 may still be spaced from the valve surface 34 during the hydraulic booster operation during the initial movement of the valve piston 26, while the plate 49 may be secured to the hydraulic power piston 53. The operation of the aforenoted modification will be substantially the same as that of the assembly illustrated in the drawing and consequently, a detailed explanation thereof will be omitted.

Obviously, many modifications and variations of the present invention are possible in light of the above teachings. It is to be understood therefore that within the scope of the appended claims, the present invention may be practiced otherwise than as specifically described herein.

What is claimed as new and desired to be secured by letters patent of the United States is:

1. A brake booster assembly operatively associated with a master cylinder, comprising:
   a differential air-vacuum pressure operated booster section including a body, a first power piston slidably received within said body so as to divide said body into first and second chambers, an input means operatively associated with a brake pedal, a first valve means adapted to be actuated in response to the movement of said input means so as to thereby create a differential air pressure between said first and second chambers which actuates said first power piston, and a reaction mechanism interposed between said first power piston and said input means;
   a hydraulic pressure operated booster section including a housing, a second power piston slidably recieved within said housing so as to divide said housing into third and fourth chambers, said second power piston having equal pressure receiving areas which are subjected to the hydraulic pressures within said third and fourth chambers, respectively, one end of said second power piston being operatively connected to said master cylinder while the other end thereof is operatively associated with said input means, a second valve means adapted to be actuated in response to the movement of said input means to so as to thereby create a differential hydraulic pressure between said third and fourth chamber which actuates said second power piston, and a hydraulic reaction means provided within said second power piston for generating reaction force to be transmitted to said input means in response to the actuation of said second valve means; and
   a delay means for actuation of one of said first and second valve means by a further movement of said input means after the booster section, operatively associated with the other of said first and second valve means, is actuated by an initial movement of said input means and reaches its run-out condition.

2. A brake booster assembly as set forth in claim 1, wherein:
   said second power piston comprises an axial stepped bore which slidably receives a spool valve therein; and
   said second valve means is provided on said second power piston and said spool valve and is controlled by a relative movement therebetween.

3. A brake booster assembly as set forth in claim 2, wherein:
   said delay means comprises a stem of said input means which is normally spaced from said spool valve.

4. A brake booster assembly as set forth in claim 2, wherein:
   said spool valve is arranged within said bore of said second power piston so as to define two chambers, at both sides of said spool valve, which are in communication with said first chamber of said vacuum booster section for thereby receiving vacuum.

5. A brake booster assembly as set forth in claim 2, wherein:
   said reaction means of said hydraulic booster section includes a hydraulic reaction chamber provides within said bore of said second power piston as a result of the disposition of said spool valve;
   said reaction chamber is always in communication with said third chamber which receives an operating hydraulic fluid and is connected to said fourth chamber through control of said second valve means; and
   1 an orifice means is provided in said spool valve to assure fluid communication between said third and fourth chambers even when said second valve means is brought into its closed condition, 6. A brake booster assembly as set forth in claim 1, wherein:
   said second power piston includes outwardly extending stems, for defining said equal pressure receiving areas, which extend to said first chamber of said vacuum booster section and to said master cylinder, respectively.

7. A brake booster assembly as set forth in claim 1, wherein:
   said reaction mechanism of said vacuum booster section comprises reaction lever means operatively associated with said first power piston and said input means, and an output member operatively associated at both sides thereof, with said reaction levers and said second power piston.

* * * * *